March 26, 1968  A. T. DEUTSCH  3,374,965
ESCAPE CAPSULE

Filed Jan. 31, 1967  2 Sheets-Sheet 1

INVENTOR
ALEXANDER T. DEUTSCH

BY

ATTORNEY

March 26, 1968     A. T. DEUTSCH     3,374,965
ESCAPE CAPSULE

Filed Jan. 31, 1967     2 Sheets-Sheet 2

INVENTOR
ALEXANDER T. DEUTSCH

BY

ATTORNEY

United States Patent Office 3,374,965
Patented Mar. 26, 1968

3,374,965
ESCAPE CAPSULE
Alexander T. Deutsch, 1735 Riggs Place NW.,
Washington, D.C. 20009
Filed Jan. 31, 1967, Ser. No. 612,883
9 Claims. (Cl. 244—1)

ABSTRACT OF THE DISCLOSURE

A sealed compartment secured to the upper top of a spacecraft and having a sealable door providing communication with the body of the spacecraft, into which astronauts may seal themselves and be safely sustained for a short time period as a safety compartment separable from the spacecraft and having means for safe transportation thereof back to earth.

---

This invention relates to an escape capsule useful for escape of travelers or astronauts from spaceships in orbit or other space passage or flight. More particularly, this invention relates to an escape capsule forming part of the structural shell of a space capsule, and detachable from the space capsule in flight, the escape capsule being heat-shielded or formed of heat insulating material and including auxiliary means for its safe return to earth.

According to the present invention applicant modifies the structure of a space capsule, converting its tip to a sealed escape capsule detachable in flight from the space capsule. The escape capsule includes capacity to house one or several persons therein with door means allowing communication for passage of persons from the space capsule to the escape capsule and safe atmospheric sealing thereof. The escape capsule further includes means for coupling and uncoupling from the space capsule. It may include means for providing a propellent force for moving the craft and dirigibility to steer the escape capsule to a selected landing spot. It includes means for providing safe housing of persons therein for a useful time period needed to effect a safe passage from space to earth. It is heat insulated or shielded against atmospheric frictional heat. Finally, the escape capsule is faired and shaped to avoid interference with movement or aerodynamic resistance of the space capsule to which it is attached.

The escape capsule hereof simply divides the space capsule so that part of it, the escape capsule, can be used as an escape system. It has an airtight latchable door which leads from the space capsule to the escape capsule. The latter is provided with the necessities for a flight up to several hours. It includes propulsion, steering and landing means. The escape capsule forms the tip of the space capsule; hence may not need an independent heat shield, since it may be part of the rocket or spacecraft heat shield system per se. Any coupling and release mechanisms, as for example small rockets, may be used to separate the escape capsule from the space capsule.

After the separation from the space capsule, the astronauts or flyers enclosed in the escape capsule can use retro-rockets, wings, parachutes, rudders or any other practical steering means to guide and land the escape capsule in a selected way. The wings can be stable or releasable. In the latter case, hydraulically or pneumatically releasable wing stabilization means can be provided.

The invention is further described with respect to the drawings, in which.

Figure 1:
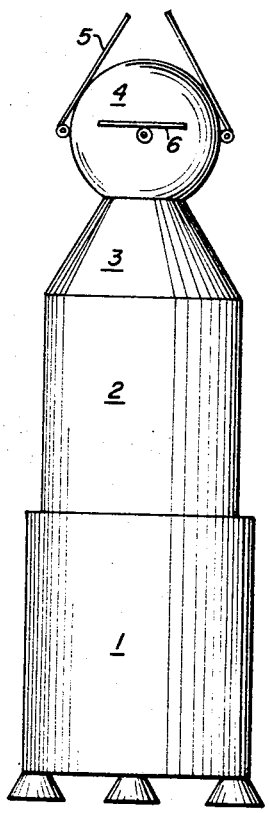
FIG. 1 shows in outline an elevation of a typical spacecraft.

Referring first to FIG. 1, a spacecraft may be launched initially as a rocket with a first stage 1, an intermediate stage 2, and an upper stage space capsule 3, upon which may be mounted the escape capsule 4, preferably including a heat shield.

The escape capsule 4 has a pair of foldable wings 5 and a rudder 6 which would be used for steering the escape of the capsule within the atmosphere.

Figure 2:
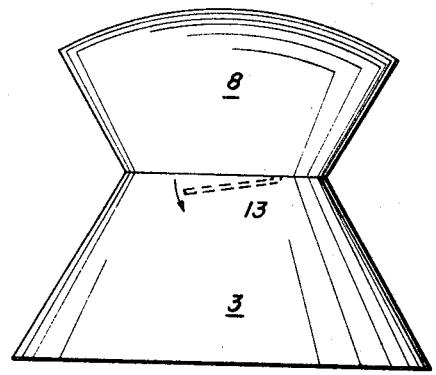
FIG. 2 illustrates schematically the nose cone and an upper stage of a spacecraft forming the escape capsule attached thereto.
Figure 3:
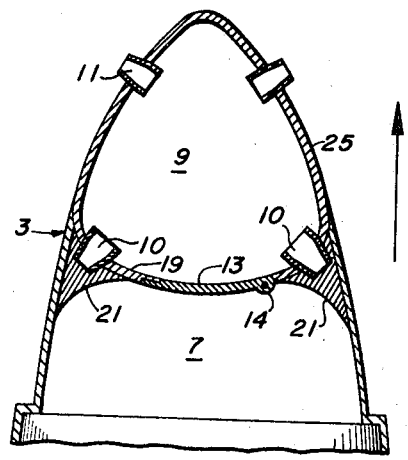
FIG. 3 is a modified form of a nose cone including an escape capsule showing means for imparting dirigibility thereto.
Figure 4:
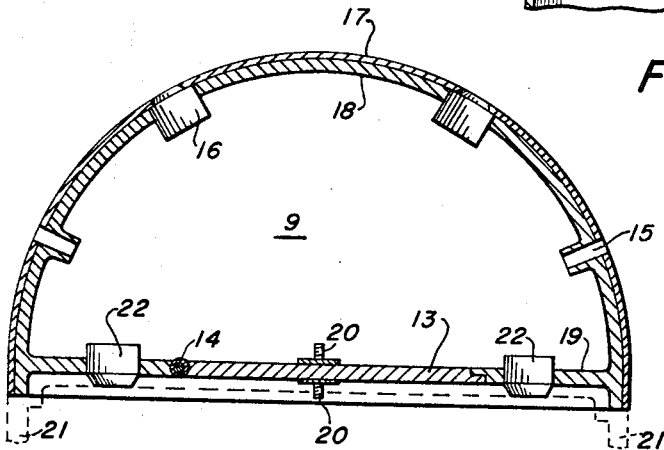
FIG. 4 is a further alternate form showing a heat shield in detail superimposed upon the escape capsule, bein also the top of the whole spacecraft.

While the escape capsule 4 is shown as spherical in FIG. 1, it may be rounded as in FIG. 2, semi-conical as in FIG. 3, or semi-circular as in FIG. 4. It may also be optionally otherwise shaped as elliptical, teardrop-shaped, flattened, parabolic, cylindrical or other faired shape consistent with good aerodynamic fairing and of intermediate curvature. The escape capsule can also form an integral part in smooth aerodynamic fairing with the tip of any space aircraft, and may be used normally in flight to house a pilot or astronaut, but it is constructed to be completely separable from the rest of the spacecraft. Such separable escape capsule can be also standardized escape equipment for any space or airship. So, in hazardous conditions, such as fire, explosion, or any other danger, the pilot cabin can be separated as an escape capsule from the rest of the spacecraft and proceed as a separate flying and desirably steerable unit.

The escape capsule may be differently shaped, as in section 8 of FIG. 2, for instance, blunt, which has improved dirigibility, or in other ways. As shown schematically in FIG. 2, an escape hatch or door 13 is provided through which the astronauts will pass from the space capsule into the escape capsule. As shown in FIG. 3, the upper stage chamber 9 may be a portion of a faired nose cone having a lower chamber that is the space capsule and which houses the astronauts in ordinary use as the upper rocket stage. The upper chamber 9 is separably fastened to the lower chamber 7 by side extensions which may frictionally or easily frangibly secure the upper chamber 9 comprising the escape capsule from the lower chamber 7.

Several rockets 10 are mounted angularly against the conically faired walls of the escape capsule 3 to release the web portion 21 by propulsive combustion of rocket fuel emitted through rockets 10 thereagainst or to separate the sections as may be held together, freeing the escape capsule chamber 9 from the body of the space capsule of the rocket. Additional retro-rockets 11 may be mounted to supply dirigibility and deceleration to the capsule returning to earth.

The walls 25 of the escape capsule may themselves comprise heat shield material to resist frictionally developed heat during the return of the capsule to earth.

Figure 5:
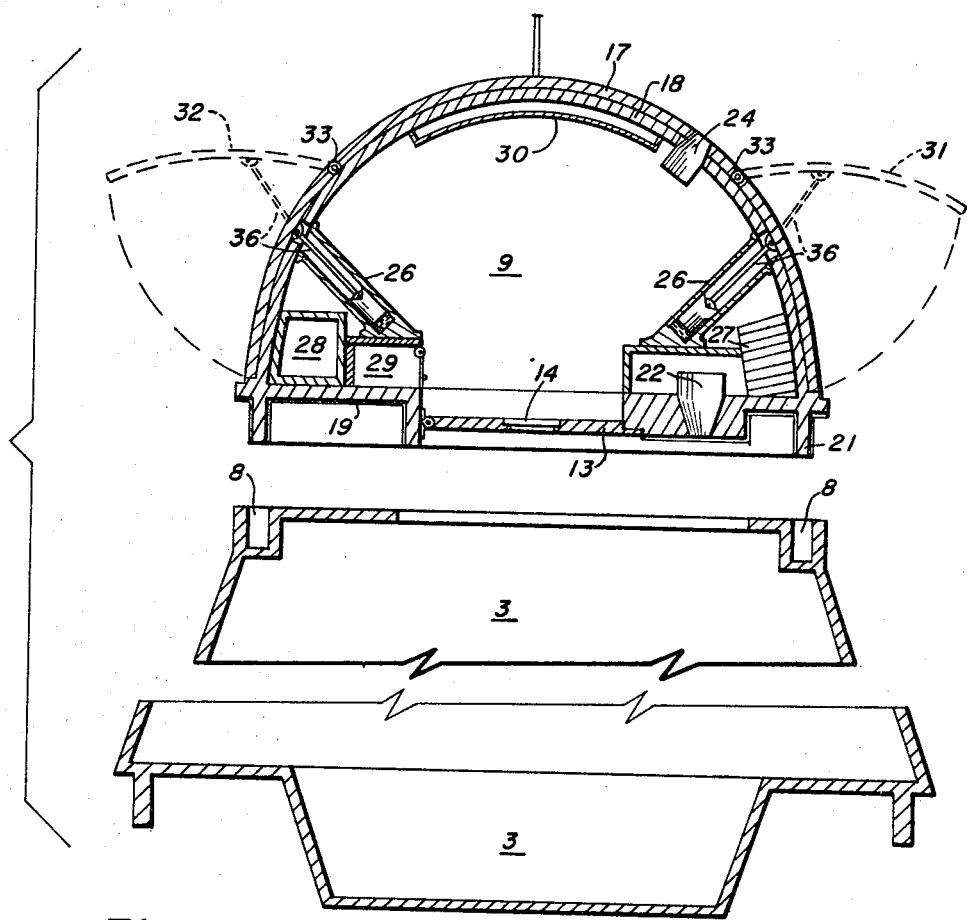
FIG. 5 shows the manner of attachment of the escape capsule to the nose cone of FIG. 4 as an upper stage of a spacecraft, the escape capsule being in section along the lines A—A of FIG. 6.
Figures 6, 7:
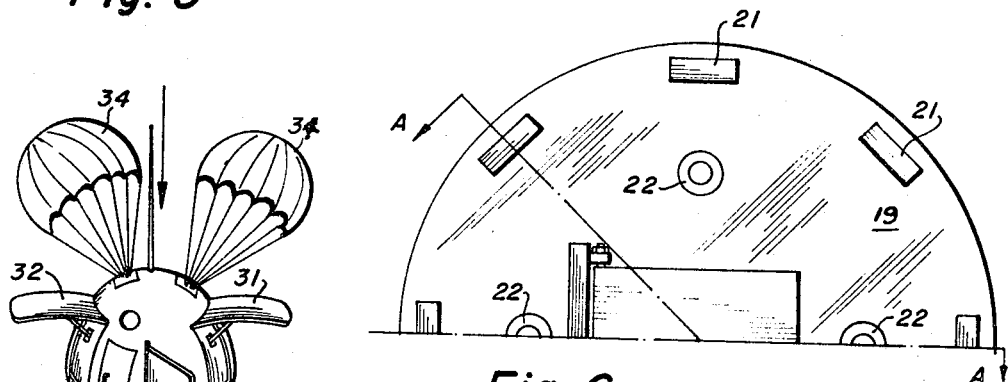
FIG. 6 is a bottom plan-view of the escape capsule of FIG. 5.
FIG. 7 illustrates in perspective the escape capsule of FIG. 5 in launching position.

FIG. 4 is a modified form shown in somewhat larger detail in FIG. 5. The figure specifically shows a heat shield of insulating ceramic material 17 about the outer shell 18 of an escape capsule. The lower wall 19 has an escape hatch 13 as in FIG. 3 which may be hinged at one end 14 and fitted into an opening in the wall 19 in an airtight manner and suitably latched (not shown). Handles 20 for manual displacement may be mounted above and below the door 13 for manual operation. As in FIG. 3, the interior chamber 9 may be fitted with lower rocket elements 22 to blast the capsule away from the spacecraft and disengage its legs 21 from the spacecraft as shown in detail in FIGS. 5, 6 and 7 below. The craft may further be fitted with various smaller rockets 15 to provide diribibility. It may further have suitably disposed containers 16 enclosing folded parachute elements 34 as shown in FIG. 7 for automatic release according to structures (not shown) known in the art for a parachute release.

FIG. 5 illustrates a preferred embodiment in greater detail. Elements 21 comprise interlocking skirt elements or legs disposed in a series annularly about the bottom wall 19 of the escape capsule as shown in detail in FIG. 6. These legs are received in sockets 8 disposed in the upper separable rim of the spacecraft 3, frictionally or otherwise releasably fitted therein, and upon actuation of rockets 22 they will force release of the escape capsule from the space capsule. The door 13 may close automatically and may be provided with an observation window 14 fitted therein. The faired sides of the airtight escape capsule may have portions severed and hinged for swinging movement outward from the shell 18 or heat shield 17 whereby they may serve useful control and dirigibility purposes for safely landing the craft in the earth's atmosphere. For instance, one pair of sections 31 and 32 may be hinged at 33 to the shield 17 and swing outwardly on hinges 33 to form winged elements as shown in FIGS. 5 and 7 to impart atmospheric wing support. They can be thus extended to wings by arms 36 attached to pistons in hydraulic or pneumatic cylinders 26. Another portion 35 of the shell or shield 17, also hingedly mounted (not shown), may be swung outward to the extended position shown in FIG. 7 for operation as a rudder. These wings and rudder may be supported rigidly in their open positions as shown in FIG. 7 such as by bracing arms 36, cooperating with each wing to maintain the wings in the selected open position. The rudder 35 will have a steering arm (not shown) with the capsule for moving the hinged rudder horizontally to effect steering.

The escape capsule may also contain a power pack 27 such as a fuel cell, an air or oxygen supply 28, food and water containers 29, an instrument panel 30 to provide dirigibility and propulsion, as well as safety equipment and such other life-saving elements necessary for safe transport of passengers therein for several hours.

I claim:

1. An escape capsule comprising an autonomous faired space structure adapted for integral mounting as the outer tip of a spacecraft, door means providing communication between the escape capsule and the space capsule, said escape capsule having walls, extendable gliding surfaces pivotally supported by said walls adapted to guide and aerodynamically sustain said craft in atmospheric flight and landing thereof on earth, and means in said craft to selectively extend said gliding surfaces from a folded position against and approximately streamlined to the walls to an about 90° extended position with respect to the longitudinal axis of said craft.

2. The escape capsule as defined in claim 1 further including retrorockets positioned to further control landing said aircraft on earth.

3. The escape capsule of claim 1 wherein the outer walls are a heat shield forming an original part of the spacecraft.

4. The escape capsule as defined in claim 1 wherein portions of the outer walls are movable to form said guide and sustaining elements.

5. The escape capsule as defined in claim 1 wherein portion of the outer walls are movable to form said guide and sustaining elements and rudder elements and the movement of said elements is effected by hydraulic or pneumatic means.

6. The escape capsule as defined in claim 1 wherein the walls further include parachute means releasable therefrom.

7. Escape capsule as defined in claim 1 wherein the means for separating the escape capsule from the spacecraft comprise rocket elements whose actuation forces the separation.

8. Escape capsule as defined in claim 1 wherein the escape capsule and spacecraft are held together by several supporting link elements extending from the lower side of said escape capsule and upon which the capsule rests as landing supports.

9. Escape capsule as defined in claim 1 wherein the escape capsule is mounted as the forward tip of the pilot's cabin of a high velocity aircraft.

References Cited

UNITED STATES PATENTS

| | | | |
|---|---|---|---|
| 3,054,584 | 9/1962 | Andras | 244—139 |
| 3,231,219 | 1/1966 | Young | 244—1 |
| 2,941,764 | 6/1960 | Lee et al. | 244—140 |
| 3,090,580 | 5/1963 | Kehlet et al. | 244—1 |
| 3,289,974 | 12/1966 | Cohen et al. | 244—1 |

OTHER REFERENCES

Interaavia No. 7, 1960, pp. 860, 861 "Manned Earth Satellites."

FERGUS S. MIDDLETON, *Primary Examiner.*